Jan. 5, 1932.  M. G. TORMO  1,840,216
CONDUIT SUPPORT
Filed May 18, 1931   2 Sheets-Sheet 1
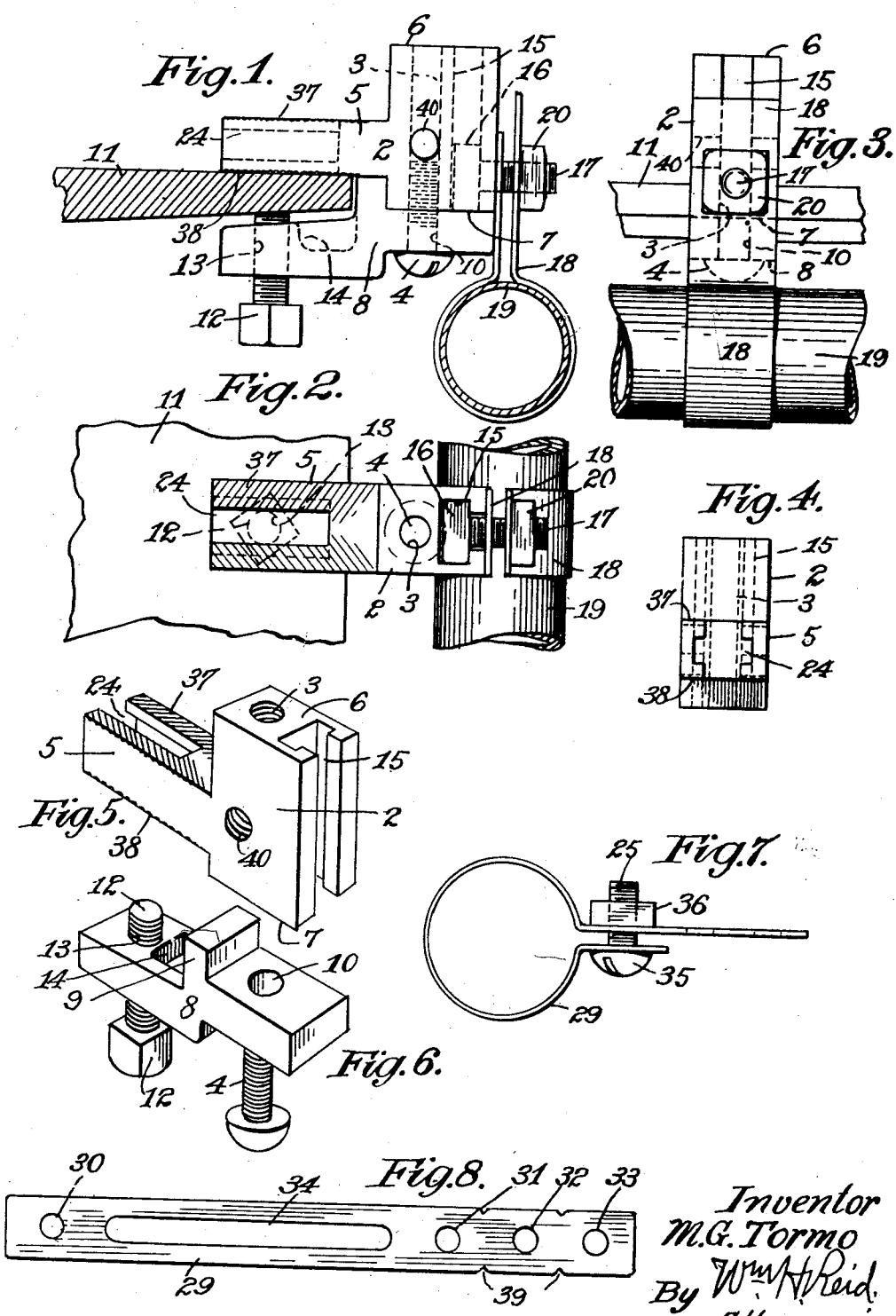

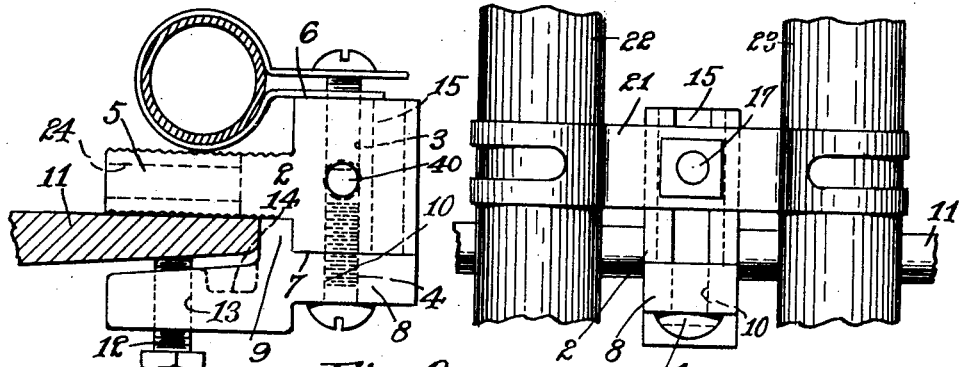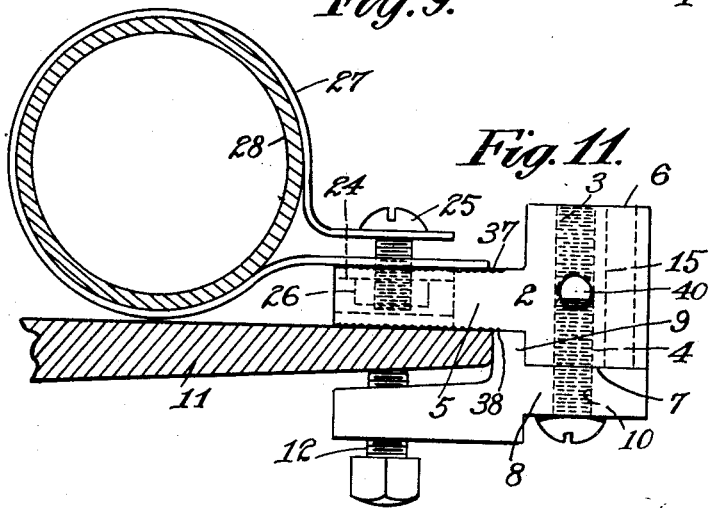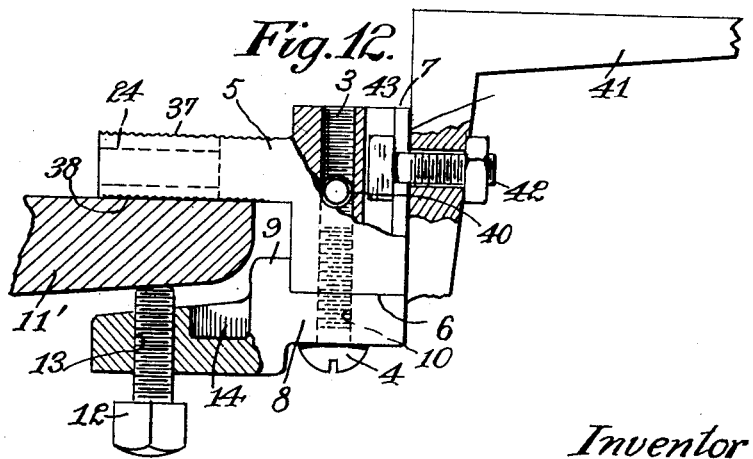

Patented Jan. 5, 1932

1,840,216

UNITED STATES PATENT OFFICE

MANUEL G. TORMO, OF JAMAICA, NEW YORK

CONDUIT SUPPORT

Application filed May 18, 1931. Serial No. 538,221.

This invention relates to supporting means for conduits or various cylindrical articles of this nature or can constitute an anchoring means to support any desired work member or members and is especially designed for application to structural members such as the flange of a beam or column.

The object of this invention is to provide a device of this character that can be readily clamped to the flange of a structural member of a considerable range of thickness, and which bracket or support is provided with means for easily and quickly mounting or screwing conduits or the like extending in different directions relative to the beam as may be desired; and also wherein a number of such conduits can be supported on or to the bracket and which extend in various directions, and support numerous other work members.

In the accompanying drawings showing one embodiment of my invention:

Figure 1 shows the device clamped to a flange and carrying a conduit.

Fig. 2 is a plan view of the arrangement shown in Fig. 1.

Fig. 3 is an end elevation of the parts shown in Fig. 1.

Fig. 4 is an end view of the block member.

Fig. 5 is a perspective view of the block member.

Fig. 6 is a perspective view of the clamping arm.

Fig. 7 shows the use of a clamping strap.

Fig. 8 shows the strap before bending.

Fig. 9 shows the device supporting a conduit resting on the arm.

Fig. 10 is a plan view showing the support for two conduits.

Fig. 11 shows nut means of supporting the conduit on the bracket.

Fig. 12 shows the bracket assembled on a flange with the block member inverted and supporting another structural member.

As shown in the drawings the bracket comprises essentially a body member composed of a block and an arm, and a clamping bar that is secured to the block to clamp the structural flange between the bar and the arm. The block 2 is provided with screw-threaded bore 3 extending through the block from one end to the other, adapted to receive a clamping bolt 4. An arm 5 projects transversely from one side of the block at an intermediate portion, and this arm is located at a greater distance from the end 6 of the block than from the opposite end 7 of the block, for reasons that will be set forth.

The clamping bar 8 is provided with a lug 9 at the middle portion, between which and one end is a bore 10 through which passes the clamping bolt 4, and this hole is so arranged that the lug 9 will engage the side of the block when the bar is brought against one end, 6 or 7 of the block and the bolt is passed through the hole 10 and screwed into the block bore 3 as shown in Fig. 1. The other end portion of the bar 8, when it has been so secured to the block, will be spaced from the arm 5 beyond the lug 9, so that a structural flange 11 can be clamped between the bar and arm. This is effected by means of a clamping bolt 12 that turns in a screw-threaded bore 13 in the bar. It will be readily understood that after the bolt 4 has secured the bar to the block, the device can be applied to the flange 11 by simply sliding it on, and then the bolt 12 is screwed up by a wrench, and will force the arm 5 against the upper face of the flange and securely hold the bracket on the flange. If desired a socket portion can be provided at 14 in the bar to reduce the weight.

By having the arm 5 located a greater distance from one end of the block than it is from the other end, the bar 8 can be secured to the end 6, instead of at the end 7 of the block, that is, the block can be inverted and obviously when the bar 8 is applied to the end 6, as shown in Fig. 12, the free end of the bar, that carries the clamping bolt 12, will be separated a greater distance from the arm 5 of the block. Since the threaded bore projects through the block, the same bolt 4 will clamp the bar to either end of the block; and the bolt 12 can now be screwed up against the flange 11′ shown in this view, that is considerably thicker than the flange 11.

Various means can be used for securing conduits and similar work members of a cylindrical form, or otherwise, to the bracket, that is to the block or arm, particularly. The block 2 is shown provided with a vertical slot 15 in the side wall opposite the arm 5, extending from end to end, and which is undercut or channeled on each side, so that a square bolt head 16 may be inserted to slide in this slot with the bolt 17 projecting laterally, and this bolt may receive clamping strap 18 that carries a conduit 19, see Fig. 1, by securing the nut 20 on the bolt 17.

In Fig. 10, a similar arrangement is shown where a double strap 21 carried by the bolt 17 can support two conduits 22 and 23 in a vertical position. Obviously a similar arrangement might carry two conduits in a horizontal position similar to the conduit 19.

The arm 5 is shown provided with a slot 24 extending inwardly from the free end, with undercut side walls or channels, see Fig. 4, so that a clamping bolt 25 can have its nut 26 passed through this slot from the end, the bolt projecting downward to receive a clamping strap 27 to support a conduit 28, see Fig. 11. Obviously a double clamping strap such as 21 could support a pair of conduits in the same manner by the same bolt 25 since this slot 24 passes vertically through the arm when the block and arm are inverted, as in Figs. 4 and 12, the same clamping bolt and straps can be employed. In Figs. 7 and 8 I show a strap 29 with a single hole 30 at one end and holes 31, 32, 33 at the other end and intermediate slot 34, which is designed to be employed with clamping bolt 35 and a nut 36, with notches 39 in the strap.

The slotted face 37 and 38 of the arm 5 are preferably provided with teeth or serrations, so that they will have a kind of bite on the face of the flange member 11 when pressed together between clamping bolt 12, a threaded bore 40 extends across the block, to receive a clamping bolt and a strap, such as 29, to a conduit on either or both sides similar to that shown in Fig. 1.

The bracket can be secured to a flange, as shown in Fig. 12, and to support a cross bar or channel 41 whose other end is supported in the same manner by a similar bracket mounted on another structural flange and thus the bar 41 that has its angle clamped by bolt 42 and nut 43 to the slot 15 in the block 2 can have a number of conduits or other work members carried thereon.

What I claim is:—

1. A supporting bracket comprising a block, a clamping bar, a clamping bolt, the block having a vertical screw threaded bore to receive the clamping bolt at each end of the block, an arm extending laterally from one face of the block, the clamping bar provided with a cross bore at one end portion to have said clamping bolt pass through the cross bore into the threaded block bore to clamp the bar to the block at either block end at will with the bar extending opposite the face of the arm to receive a structural flange or plate between the bar and arm, said bar having a screw threaded cross bore, and a clamping screw in said latter bore adapted to press said flange or plate against the face of the arm and thereby lock the bracket to a structural flange.

2. A supporting bracket comprising a block, a clamping bar, a clamping bolt, the block having a vertical screw threaded bore to receive the clamping bolt at each end of the block, a slotted arm extending laterally from one face of the block with a vertical slot extending inwardly from the free end with the opposite side walls of such slot being slotted whereby such arm slots can receive the heads of clamping bolts to project upwards or downwards, the clamping bar provided with a cross bore at one end portion to have said clamping bolt pass through the cross bore into the threaded block bore to clamp the bar to the block at either block end at will with the bar extending opposite one said slotted face of the arm to receive a structural flange or plate between the bar and arm, said bar having a screw-threaded cross bore, and a clamping screw in said latter bore adapted to press said flange or plate against the slotted face of the arm and thereby lock the bracket to a structural flange.

3. A supporting bracket comprising a block, a clamping bar, a clamping bolt, the block having a vertical screw threaded bore to receive the clamping bolt at each end of the block, an arm extending laterally from one face of the block, the clamping bar provided with a cross bore at one end portion to have said clamping bolt pass through the cross bore into the threaded block bore to clamp the bar to the block at either block end at will with the bar extending opposite the face of the arm to receive a structural flange or plate between the bar and arm, said bar having a screw threaded cross bore, and a clamping screw in said latter bore adapted to press said flange or plate against the face of the arm and thereby lock the bracket to a structural flange, said block at the side face opposite the extension being provided with a vertical slot extending from end to end with a slot in each of the opposite side walls to provide housing for bolt heads that extend laterally and serve to clamp a work member to the block.

4. A supporting bracket comprising a block, a clamping bar, a clamping bolt, the block having a vertical screw threaded bore to receive the clamping bolt at each end of the block, a slotted arm extending laterally from one face of the block with a vertical slot extending inwardly from the free end with the opposite side walls of such slot being slotted whereby such arm slots can receive the heads of clamping bolts to project upwards or downwards, the clamping bar provided with a cross bore at one end portion to have said clamping bolt pass through the cross bore into the threaded block bore to clamp the bar to the block at either block end at will with the bar extending opposite one said slotted face of the arm to receive a structural flange or plate between the bar and arm, said bar having a screw-threaded cross bore, and a clamping screw in said latter bore adapted to press said flange or plate against the slotted face of the arm and thereby lock the bracket to a structural flange, said block at the side face opposite the extension being provided with a vertical slot extending from end to end with a channel in each of the opposite side walls of the slot to provide housing for bolt heads that extend laterally and serve to clamp a work member to the block.

5. A supporting bracket comprising a block, a clamping bar, a clamping bolt, the block having a vertical screw threaded bore to receive the clamping bolt at each end of the block, an arm extending laterally from one face of the block, the clamping bar provided with a cross bore at one end portion to have said clamping bolt pass through the cross bore into the threaded block bore to clamp the bar to the block at either block end at will with the bar extending opposite one face of the arm to receive a structural flange or plate between the bar and arm, said bar having a screw threaded cross bore, a clamping screw in said latter bore adapted to press said flange or plate against the face of the arm and thereby lock the bracket to a structural flange, said arm having one face located a greater distance from the adjacent apertured end face of the block than the opposite face of the arm is spaced from the opposite apertured end face of the block whereby the alternate clamping of the bar to the opposite block ends will bring the bar at different distances spaced from the end face of the arm to provide for clamping of different thicknesses of structural members between said clamping screw of the arm.

6. A supporting bracket comprising a block, a clamping bar, a clamping bolt, the block having a vertical screw threaded bore to receive the clamping bolt at each end of the block, a slotted arm extending laterally from one face of the block with a vertical slot extending inwardly from the free end with the opposite side walls of such slot being slotted whereby such arm slots can receive the heads of clamping bolts to project upwards or downwards, the clamping bar provided with a cross bore at one end portion to have said clamping bolt pass through the cross bore into the threaded block bore to clamp the bar to the block at either block end at will with the bar extending opposite one said slotted face of the arm to receive a structural flange or plate between the bar and arm, said bar having a screw-threaded cross bore, and a clamping screw in said latter bore adapted to press said flange or plate against the slotted face of the arm and thereby lock the bracket to a structural flange, said block at the side face opposite the extension being provided with a vertical slot extending from end to end with a channel in each of the opposite side walls of the slot to provide housing for bolt heads that extend laterally and serve to clamp a work member to the block, said slotted arm having one said slotted face located a greater distance from the adjacent apertured end face of the block than the opposite slotted face of the arm is spaced from the other apertured end face of the block whereby the alternate clamping of the bar to the opposite block ends will bring the bar at different distances spaced from the end face of the arm to provide for clamping of different thicknesses of structural members between said clamping screw and the arm.

7. A supporting bracket comprising a block, a clamping bar, a clamping bolt, the block having a vertical screw threaded bore to receive the clamping bolt at each end of the block, a slotted arm extending laterally from one face of the block with a vertical slot extending inwardly from the free end with the opposite side walls of such slot being slotted whereby such arm slots can receive the heads of clamping bolts to project upwards or downwards, the clamping bar provided with a cross bore at one end portion to have said clamping bolt pass through the cross bore into the threaded block bore to clamp the bar to the block at either block end at will with the bar extending opposite one said slotted face of the arm to receive a structural flange or plate between the bar and arm, said bar having a screw-threaded cross bore, and a clamping screw in said latter bore adapted to press said flange or plate against the slotted face of the arm and thereby lock the bracket to a structural flange, said slotted arm having one said slotted face located a greater distance from the adjacent apertured end face of the block than the opposite slotted face of the arm is spaced from the other apertured end face of the block whereby the alternate clamping of the bar to the opposite block ends will bring the bar at different distances spaced from the end face of the arm to provide for clamping of different thicknesses of structural members between said clamping screw and the arm.

8. A supporting bracket comprising a block, a clamping bar, a clamping bolt, the block having a vertical screw threaded bore to receive the clamping bolt at each end of the block, an arm extending laterally from one face of the block, the clamping bar provided with a cross bore at one end portion to have said clamping bolt pass through the cross bore into the threaded block bore to clamp the bar to the block at either block end at will with the bar extending opposite the face of the arm to receive a structural flange or plate between the bar and arm, said bar having a screw threaded cross bore, and a clamping screw in said latter bore adapted to press said flange or plate against the face of the arm and thereby lock the bracket to a structural flange, a holding strap to secure a conduit to the bracket comprising a strap having one end portion apertured and bent transversely, the strap having at the other end a series of holes with indicating edge notches between the holes, the strap also having a middle slot at the intermediate portion.

Signed at New York city, N. Y., on March 27, 1931.

MANUEL G. TORMO.